United States Patent [19]

Hampton et al.

[11] Patent Number: 4,715,347

[45] Date of Patent: Dec. 29, 1987

[54] METHOD AND APPARATUS FOR PRETREATMENT OF FUEL BY PARTIAL COMBUSTION WITH A COMPOSITE CATALYST

[75] Inventors: Keith Hampton; Johannes Schwank, both of Ann Arbor, Mich.

[73] Assignee: Eaton Corporation, Cleveland, Ohio

[21] Appl. No.: 899,690

[22] Filed: Aug. 25, 1986

[51] Int. Cl.$^4$ ............................................. F02M 31/16
[52] U.S. Cl. ..................... 123/551; 123/48 D
[58] Field of Search ............... 123/1 A, 3, 272, 286, 123/287, 292, 536, 550, 551, 78 D, 48 D; 431/7

[56] References Cited

U.S. PATENT DOCUMENTS

| | | | |
|---|---|---|---|
| 2,247,181 | 6/1941 | Berhoudar | 123/551 X |
| 2,578,147 | 12/1951 | Nims | 123/551 X |
| 4,036,180 | 7/1977 | Noguchi et al. | 123/550 X |
| 4,074,661 | 2/1978 | Noguchi et al. | 123/551 X |
| 4,104,995 | 8/1978 | Steinbock | 123/78 D |
| 4,131,086 | 12/1978 | Noguchi et al. | 123/551 X |
| 4,202,300 | 5/1980 | Skay | 123/48 D |
| 4,415,537 | 11/1983 | Vine et al. | 431/7 X |

*Primary Examiner*—Willis R. Wolfe, Jr.
*Attorney, Agent, or Firm*—J. Gordon Lewis; John R. Benefiel

[57] ABSTRACT

An apparatus and method for pretreatment of fuel in a combustion device such as an internal combustion engine, in which a fuel is partially combusted by a catalytic reaction to form a high temperature hydrogen-rich product gas, which gas is thereafter directly injected into an oxidizing atmosphere in the combustion chamber of the device. A composite catalyst is utilized constituted by diverse catalytic materials to achieve different contributing effects on the catalytic combustion process by the respective materials, particularly the inhibition of coke formation by the use of magnesium oxide, and platinum to achieve low temperature ignition and partial combustion of a fuel-oxidizer mixture.

9 Claims, 2 Drawing Figures

METHOD AND APPARATUS FOR PRETREATMENT OF FUEL BY PARTIAL COMBUSTION WITH A COMPOSITE CATALYST

BACKGROUND OF THE INVENTION

1. Field of the Invention

The present invention concerns combustion devices and more particularly a method and apparatus for pretreating hydrocarbon fuel to achieve an activated condition to reduce delays in ignition and combustion of the fuel upon injection into the combustion chamber of a combustion device.

2. Description of the Prior Art

It has heretofore been proposed to achieve so called "hypergolic" combustion, particularly of hydrocarbon fuels in an internal combustion engine, such that ignition delay and the time required to complete combustion are both negligible after the fuel is introduced into an oxidizing atmosphere.

For a detailed discussion, see U.S. Pat. No. 4,448,176; SAE paper no. 850089 "Hypergolic Combustion in an Internal Combustion Engine"; and, SAE paper 820356, "The Influence of Initial Fuel Temperature on Ignition Delay"; each of which are incorporated herein by reference.

Hypergolic combustion has a number of advantages, as detailed in the aforementioned references, particularly in the context of internal combustion reciprocating engines.

As also detailed in the aforementioned references, ignition delay is believed to occur due to the need for the fuel molecules to first be disassociated into radicals in order to combine with oxygen molecules, which themselves must be disassociated for oxidation to occur. In a typical combustion process, an ignition device such as a spark plug causes a localized increased concentration of fuel radicals in a fuel-air mixture, sufficient for initiation of combustion. The release of heat from that localized combustion in turn causes additional disassociation of adjacent fuel molecules to enable combustion to propagate through the entire charge of fuel-air mixture.

As discussed in the aforementioned U.S. Pat. No. 4,448,176, if there is a pretreatment of the fuel such as to cause a disassociation of a critical proportion of molecules in each quantity of fuel, much higher than the proportion occurring at ambient temperatures, there is an "activation" of the fuel yielding substantially instantaneous ignition and combustion.

In order that such an increased, critical proportion of fuel molecules be disassociated into radicals, energy must be expended to bring this proportion of the fuel molecules to the relatively high energy state corresponding to the disassociated condition of the fuel molecules.

As described in the aforementioned U.S. Pat. No. 4,448,176, if fuel is heated to relatively elevated temperatures in excess of 1000 F.°, this causes such critical proportion of fuel molecules to be disassociated to form radicals, since such proportion of the fuel molecules is thereby brought to a high energy state.

A disadvantage of preheating of the fuel is the tendency for cracking of the fuel molecules at high temperatures, and the resultant formation of coke, tending to clog the fuel flow passages.

In co-pending application Ser. No. 813,882 filed on Dec. 26, 1986, attorney docket no. 85 ERC 271, now U.S. Pat. No. 4,651,703, there is described a method and system for heating of the fuel to elevated temperatures by partial combustion of the fuel prior to being injected into the combustion chamber. This process is able to heat the fuel to such sufficiently elevated temperatures, that upon injection into the combustion chamber hypergolic combustion will result.

Alternatively, catalysis is utilized to augment the effect of heating to achieve fuel activation.

In SAE paper 800264 entitled "Gasification of Diesel Fuel for a Low Emission, High Efficiency Engine System"; in Siemens Forsch.-u. Entwickl.-Ber. Bd. 6 (1977) Nr. 5, entitled "Autothermal Gasification of Liquid Hydrocarbons by Partial Oxidation"; and Siemens Forsch.-u. Entwickl.-Ber. Bd. 7 (1978) Nr. 2 entitled "Compact Gas Generator for Fuel Gasification Aboard Motor Vehicles" each of which is hereby incorporated by reference, there is disclosed a method of gasifying liquid hydrocarbon fuels.

This method also involves partial oxidation of the fuel in the presence of a catalyst to form a high temperature gas, rich in hydrogen and hydrocarbon radicals. This gas is described as being useable as a fuel for an internal combustion engine if it is cooled to room temperature and mixed with air as in a conventional spark ignited engine.

It is desirable in using partial combustion to preheat the fuel to limit the degree of combustion to that strictly necessary to achieve the desired level of formation of radicals so as to not expend an undue proportion of the heat energy of the fuel in pretreatment.

It is also desirable to limit the temperature of the product gas to minimize the formation of coke which tends to clog the various flow passages.

Partial combustion by means of a catalytic reaction is highly desirable to accomplish these ends, since such combustion in the presence of a catalyst tends to produce a high proportion of radicals, and such combustion can be initiated and will proceed at much lower temperatures. This allows the elimination of an ignition device to initiate the partial combustion process.

The partial combustion process itself may be more precisely controlled by the use of a particular catalyst material and using a preselected catalyst morphology.

Accordingly, it is an object of the present invention to provide an apparatus and method of pretreating fuel to achieve a high proportion of radical formation such as to enable hypergolic combustion by catalytic partial combustion of vaporized fuel which optimizes the catalytic effect such as to eliminate or substantially alleviate the tendency for coke formation and allowing catalytic ignition of the fuel in the pretreatment phase.

SUMMARY OF THE INVENTION

These and other objects of the present invention are accomplished by passing a compressed mixture of vaporized fuel and a slight proportion of an oxidizer fluid over a bed of a particular composite of catalytic material to initiate a partial catalytic combustion of the fuel to produce a characteristic activated gas rich in hydrogen and fuel radicals.

The composite catalytic bed according to the preferred embodiment includes a first catalytic material having a specific characteristic causing spontaneous partial combustion to occur without the need for an ignition device, and which proceeds at a relatively low temperature while yielding a relatively high proportion of radicals.

The composite catalytic bed also includes at least one diverse second catalytic material which in the preferred embodiment has a specific characteristic to inhibit coke production to prevent clogging of the fuel flow passages.

In the preferred embodiment the first catalytic material comprises platinum metal deposited on an alumina substrate, while the second catalytic material comprises magnesium oxide, with alternate layers thereof inhibiting coke formation throughout the catalytic bed.

This product gas is at a temperature sufficiently elevated to enable hypergolic combustion as defined above, and according to the concept of the present invention, is directed into the combustion chamber of a combustion device while still at the elevated temperature.

The combustion chamber contains an oxidizing fluid atmosphere such as compressed air, and with the fuel in an activated state, ignition and combustion are immediate, with an effective recovery of heat energy released by the fuel, both during the partial and subsequent complete combustion stages.

This partial combustion process yields a high temperature, activated, hydrogen-rich product gas, closely controlled as to temperature and the state of activation thereof, but does not produce significant coke formation, and accordingly advantageously allows the efficient accomplishment of enhanced combustion, without resulting problems of clogging by coke formation.

The process is particularly applicable to internal combustion engines, and the partially combusted gaseous fuel may be at high pressure so as to be able to be injected into the engine combustion chamber.

DETAILED DESCRIPTION

In the following detailed description, certain specific terminology will be employed for the sake of clarity and particular embodiment described in accordance with the requirements of 35 USC 112, but it is to be understood that the same is not intended to be limiting and should not be so construed inasmuch as the invention may take many forms within the scope of the appended claims.

As developed in detail in the above referenced articles, partial catalytic combustion may be generally applicable to hydrocarbon and/or other combustible fuels such as gasoline, diesel fuel, and light fuel oil, alcohols, natural gas, etc.

Figure 1:
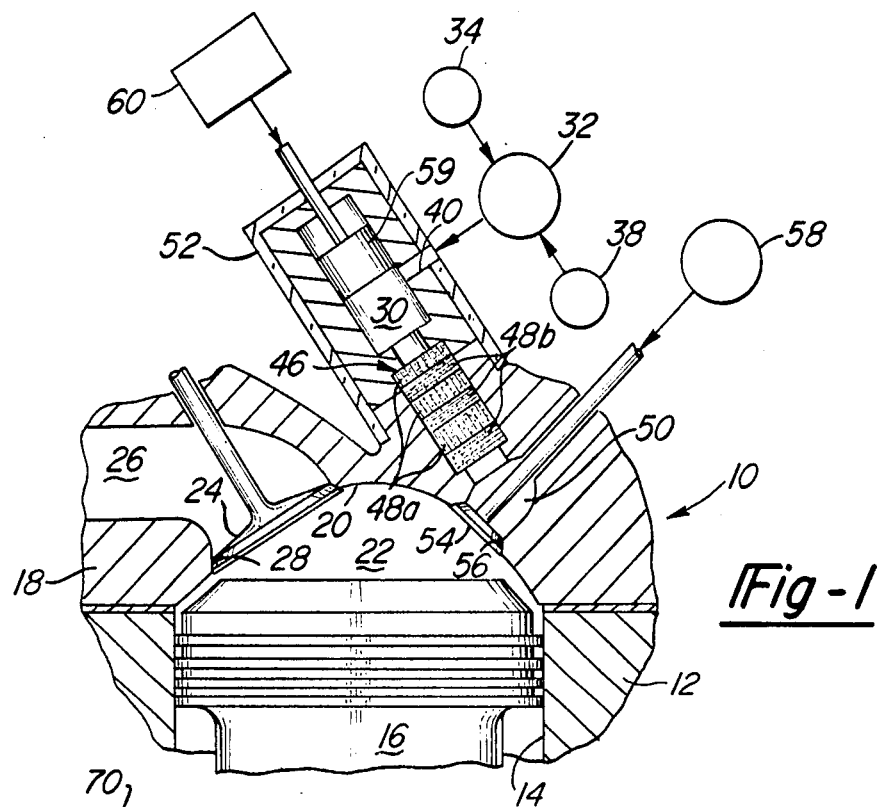
FIG. 1 is a partially sectional view of an internal combustion engine incorporating apparatus for partial catalytic combustion of the fuel according to the process and apparatus of the present invention.

Referring to FIG. 1, an arrangement according to the present invention is shown for accomplishing partial catalytic combustion in the context of an internal combustion engine 10, which includes an engine block 12 formed with a cylinder bore 14 and having a reciprocating piston 16 disposed therein. A cylinder head 18 is formed with inner surfaces 20 which together with the piston 16 and bore 14 define a combustion chamber 22. Intake valve 24 is disposed such as to be seated on valve seat 28 and controlling communication of an intake air passage 26 with the combustion chamber 22. A similar exhaust valve, valve seat and exhaust passage (not shown) are also provided to enable the products of combustion to be removed from the combustion chamber 22.

According to the concept of the present invention, a gasifier chamber 32 is provided into which is sprayed a liquid fuel from a fuel source 34 as via a nozzle 36 such as to vaporize the fuel into the gasifier chamber 32. The fuel source 34 preferably also includes means for preheating the fuel as by means of an exhaust system heat exchanger, as described in U.S. Pat. No. 4,644,925.

Also provided is a source 38 of gasifier oxidizer which may direct air under pressure into gasifier chamber 32 with means provided to form a much richer than stoichiometric fuel-air mixture of the proportions as described in the above referenced articles.

To initiate partial combustion, the preheated fuel-air mixture in chamber 32 is passed into a pressurizing chamber 30 via passage 40. A compressor piston 59 slidably disposed above chamber 30, is reciprocated by an actuator 60, so as to cause the air fuel fluid mixture in chamber 30 to be compressed and forced through a composite catalytic bed 46 disposed downstream of pressurizing chamber 30. The catalytic bed 46 induces partial combustion of the mixture to form a high temperature product gas in an intake chamber 50 downstream of the composite catalytic bed 46.

As noted in the above referenced U.S. Pat. No. 4,651,703, the various parameters may be controlled to produce an activation of the product gas by heating and by catalytic action to reach the critical proportion of disassociation of fuel molecules into radicals sufficient to insure hypergolic combustion.

According to the concept of the present invention the composite catalytic bed 46 contains a plurality of diverse catalytic materials in order to provide a combined effect on the resultant product gas.

Such materials may advantageously be contained in alternate sets of layers 48a and 48b, and one of the sets of layers acts to inhibit coke formation. Thus, the thickness of the other set of layers is kept small, i.e., a fraction of an inch, so that the combustion reaction in which coke could form proceeds for only a limited distance in passing through the other layers. If the distance is kept small, coke formation is minimal, even though the nature of the material is such that excessive coke would be produced if the entire depth of the bed were of material not inhibiting coke formation.

Specifically, layers of platinum coated alumina may be employed to cause spontaneous catalytic combustion of the compressed, preheated mixture received from chamber 30, alternating with layers of magnesium oxide, receiving the mixture after passing through only a short transit distance comprised of the thickness of the preceding platinum on alumina catalyst layer.

It has been discovered that magnesium oxide inhibits coke formation to a marked degree in this context, and also acts as a catalyst to itself cause disassociation of the fuel molecules, particularly when heated by the thermal energy released by the partial combustion induced by flow over the platinum-alumina catalyst material.

The morphology, thickness, etc. of the composite catalytic bed may be controlled to produce the precise effects as necessary for the given system parameters and the precise state of product gas required.

Depending on the temperature conditions reached in the partial combustion reaction, a suitable insulating jacket 52 may also be provided surrounding the chamber 32 and composite catalytic bed 46 if necessary to insure that the product gases achieve the appropriate elevated temperature and maintain such temperature as the fuel is injected into the combustion chamber 22.

Such injection is accomplished under the control of fuel intake valve 54 seating on the valve seat 56 controlling communication of the fuel intake chamber 50 with the combustion chamber 22. A suitable valve actuator 58 controls communication of the high pressure, high temperature fuel product gas in the intake chamber 50 with the combustion chamber 22.

A suitable control for the valve operator 58 enables control over the injection event and if the combustion is of a hypergolic nature, this also controls the timing of the combustion event as well.

Figure 2:
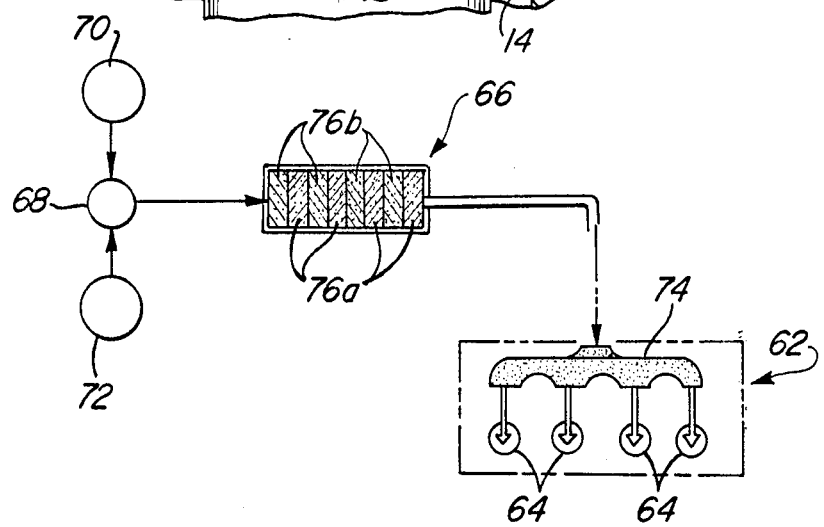
FIG. 2 is a partially sectional view of an internal combustion engine incorporating an alternate embodiment of the apparatus shown in FIG. 1 for partial catalytic combustion of fuel.

Referring to FIG. 2, an alternate embodiment is depicted in which the catalytic combustion for all of the cylinders 60 of a multicylinder internal combustion engine 62 is carried out in a common catalytic bed 66 which receives a quantity of preheated compressed air-fuel mixture, in turn received from a mixing compressing device 68. A source of oxidizer 70 and vaporized fuel source 72 supply the mixing-compressing device 68.

A compressed fuel-air mixture is thus produced in the mixing compressing device 68, which is passed into the catalytic bed 66 wherein the partial catalytic combustion and radical molecule formation occurs. The product gas is then collected in a manifold 74, with control over the passage of the compressed product gas controlled by fuel intake valve and valve operators (not shown) as before.

The catalytic bed 66 is likewise also of a composite nature in which alternate layers 76a and 76b are provided of a diverse catalytic material, such as platinum coated alumina and magnesium oxide.

In order that a more complete understanding of the effect of the parameters of preheating and air/fuel ratio, the results of tests using a composite catalytic bed are here set out.

The test involved heating a mixture of methane and air at approximately 1000 PSI and passing that mix over a two layer bed containing first 1% platinum on alpha alumina oxide, followed by 99%+ magnesium oxide. The temperature of the gasses were measured at various points within the process and the onset of catalytic combustion was presumed to occur when the temperature of the gasses coming out of the catalyst bed were higher than that of the incoming gasses. The following data table lists the inlet, outlet, and rise in temperature, Delta, in the catalyst bed, along with the air and fuel flows in SCFM, followed by the air fuel ratio as expressed by the percent of Stoichiometry.

| Inlet Temp. (°F.) | Outlet Temp. (°F.) | Delta Temp. (°F.) | Air SCFM | CH4 SCFM | Air Percent Stoich. |
|---|---|---|---|---|---|
| 448 | 333 | −115 | 2.80 | 8.28 | 1.97 |
| 469 | 738 | 269 | 2.80 | 8.28 | 1.97 |
| 480 | 765 | 285 | " | " | " |
| 495 | 907 | 412 | 4.02 | 8.40 | 2.78 |
| 505 | 929 | 424 | " | " | " |
| 519 | 1006 | 487 | 4.98 | 8.40 | 3.45 |
| 529 | 1022 | 493 | " | " | " |
| 542 | 1083 | 541 | 5.98 | 8.40 | 4.14 |
| 558 | 1098 | 540 | " | " | " |
| 570 | 1148 | 578 | 6.90 | 8.40 | 4.78 |
| 419 | 1148 | 792 | " | " | " |
| 339 | 1143 | 804 | " | " | " |
| 291 | 1175 | 884 | 8.00 | 8.40 | 5.54 |
| 275 | 1188 | 913 | " | " | " |
| 263 | 1243 | 980 | 9.70 | 8.40 | 6.71 |
| 284 | 1252 | 968 | 9.88 | " | 6.84 |
| 270 | 1359 | 1089 | 13.42 | 8.40 | 9.29 |
| 270 | 1375 | 1105 | 14.04 | 8.40 | 9.72 |
| 240 | 1519 | 1279 | 20.08 | 8.40 | 13.90 |

Accordingly it can be appreciated that the above recited objectives of the present invention are achieved by the partial catalytic combustion in a composite catalytic bed by injecting the gas over a catalytic material causing direct partial catalytic oxidation of the fuel without an ignition device. This is accomplished without the production of coke by passage over a coke inhibiting catalytic material such that a long life of the catalytic reactor bed is thereby enabled. At the same time, the coke inhibiting catalytic material itself also contributes to the formation of fuel radicals to augment the effect of the thermal energy and the alternate catalytic material.

We claim:

1. Apparatus for pretreatment of a fuel for combustion in an oxidizing atmosphere in the combustion chamber of a combustion device comprising:
   a source of fuel;
   a source of oxidizing fluid:
   a mixing chamber for receiving oxidizer fluid from said source;
   means for introducing fuel received from said fuel source into said oxidizer fluid in said mixing chamber to create a rich fuel-oxidizer fluid vapor mixture therein substantially above the stoichometric ratio;
   catalytic reactor means receiving said rich fuel-oxidizer fluid mixture from said mixture chamber and partially catalytically combusting said mixture to form a high temperature, hydrogen radical-rich product gas;
   said catalytic reactor means comprising a composite catalytic bed formed by a composite of diverse catalytic materials acting to cause ignition of said fuel-oxidizer fluid mixture and formation of fuel molecule radicals;
   compressor means for compressing said fuel-oxidizer mixture in said mixture chamber prior to passing over said catalytic bed to allow high pressure reaction of said fuel-oxidizer fluid mixture;
   means for controllably directing said compressed high temperature product gas into said combustion chamber, whereby enabling enhanced combustion therein as a result of the high temperature condition of said product gas.

2. A method of preheating a fuel to activate said fuel sufficiently to enhance combustion in an oxidizing atmosphere in a combustion chamber of a combustion device comprising the steps of:
   forming a vapor mixture of fuel and oxidizer fluid substantially richer than stoichometric;
   partially combusting said fuel in said fuel oxidizer mixture by passing said mixture over diverse catalytic materials at least one of which causes auto ignition of said mixture to produce a high temperature hydrogen rich product gas containing a high proportion of fuel molecule radicals, and the at least one other of which tends to inhibit coke formation in said product gas;

controllably directing said activated product gas into said combustion chamber, whereby enhanced combustion is achieved therein.

3. Apparatus for pretreatment of a fuel for combustion in an oxidizing atmosphere in the combustion chamber of a combustion device comprising:

a source of fuel a source of oxidizing fluid;

a mixing chamber for receiving oxidizer fluid from said source;

means for introducing fuel received from said fuel source into said oxidizer fluid in said mixing chamber to create a rich fuel-oxidizer fluid vapor mixture therein substantially above the stoichometric ratio;

catalytic reactor means receiving said rich fuel-oxidizer fluid mixture from said mixture chamber and partially catalytically combusting said mixture to form a high temperature, hydrogen radical-rich product gas;

said catalytic reactor means comprising a composite catalytic bed formed by a composite of alternate layers of diverse catalytic materials, at least one of said materials contacted by said fuel-oxidizer fluid vapor mixture and acting to cause ignition of said fuel-oxidizer fluid mixture and formation of said product gas; at least one other of said diverse catalytic molecules contacted by said product gas to act to tend to inhibit coke formation in said product gas;

means for controllably directing said high temperature product gas into said combustion chamber, whereby enabling enhanced combustion therein as a result of the high temperature condition of said product gas.

4. The apparatus according to claim 3 wherein said alternate layers of diverse catalytic material is included in said composite catalytic bed, each layer of a depth on the order of fractions of an inch.

5. The apparatus according to claim 3 wherein said at least one other of said diverse catalytic materials comprises magnesium oxide tending to inhibit formation of coke.

6. The apparatus according to claim 5 wherein said at least one of said diverse catalytic materials comprises platinum for causing auto ignition of said fuel-oxidizer fluid vapor mixture.

7. The apparatus according to claim 3 wherein said combustion device comprises a multicombustion chamber internal combustion engine, and said catalytic reactor means comprises a plurality of said composite catalytic beds each associated with a respective combustion chamber.

8. The method according to claim 7 wherein said step of passing said fuel-oxidizer fluid mixture over diverse catalytic materials includes the step of passing said mixture into contact with surfaces composed of magnesium oxide to act to minimize coke formation.

9. The method according to claim 7 wherein said combustion device comprises a multicylinder reciprocating piston internal combustion engine, and each cylinder thereof receives a portion of said activated fuel and wherein said step of passing said fuel-oxidizer fluid mixture over a series of catalytic materials comprises the step of passing portions of said fuel-oxidizer fluid mixture over a separate catalytic reactor bed associated with each respective cylinder.

* * * * *